United States Patent [19]

Marable et al.

[11] Patent Number: 5,797,207
[45] Date of Patent: Aug. 25, 1998

[54] GUN GRIP PANEL

[76] Inventors: David Marable, 41465 Avenida de la Reina, Temecula, Calif. 92592; John Cato, 30536 Rolling Hills Dr., Valley Center, Calif. 92082

[21] Appl. No.: 708,091

[22] Filed: Aug. 30, 1996

[51] Int. Cl.$^6$ ................................................. F41C 23/10
[52] U.S. Cl. ................................................. 42/71.02
[58] Field of Search ........................ 42/71.02, 85, 90; 89/1.42

[56] References Cited

U.S. PATENT DOCUMENTS

| | | | |
|---|---|---|---|
| D. 273,316 | 4/1984 | Lambert | D22/1 |
| D. 300,057 | 2/1989 | Ruger et al. | D22/108 |
| D. 351,638 | 10/1994 | Scott et al. | D22/108 |
| D. 354,110 | 1/1995 | Scott et al. | D22/108 |
| 3,327,421 | 6/1967 | Finkelstein | 42/71.02 |
| 3,758,978 | 9/1973 | Theodore | 42/71.02 |
| 4,286,401 | 9/1981 | Pachmayr et al. | 42/71.02 |
| 4,346,530 | 8/1982 | Stewart et al. | 42/71.02 |
| 4,625,445 | 12/1986 | Ruger | 42/71.02 |
| 4,771,562 | 9/1988 | Rugter | 42/71.02 |
| 4,843,946 | 7/1989 | Gladstone et al. | 89/15 |
| 4,934,084 | 6/1990 | Thomas | 42/71.01 |
| 4,998,367 | 3/1991 | Leibowitz | 42/71.02 |
| 5,615,508 | 4/1997 | Miller et al. | 42/71.01 |

FOREIGN PATENT DOCUMENTS

| | | | |
|---|---|---|---|
| 2559251 | 8/1985 | France | 42/71.02 |
| 319461 | 3/1920 | Germany | 42/71.02 |

*Primary Examiner*—Stephen M. Johnson
*Attorney, Agent, or Firm*—Eastman & Associates

[57] ABSTRACT

An improved gun grip panel includes two pieces of a carbon, kevlar or carbon/kevlar mix material separated by a spacer. This material and spacer are encapsulated in a clear resin. The combination of strong, lightweight woven material and resin provide improved strength and resiliency to the gun grip panel without disadvantageously increasing the panel's weight. The clarity of the resin allows the woven material to be visible through the resin, giving the gun grip panel an ornamental appearance. Also, the gun grip panel may be textured to improve the grip of the user of the handgun. The inventive method of manufacturing the improved gun grip panel includes cutting a pair of gun-grip-panel-sized inserts from the woven material. The two pieces of material, with the spacer between them, is positioned to cover the bottom of a silicone mold. The silicone mold is then sandwiched between a pair of rigid plexiglass sheets, and the combination is placed in a chamber. Inlet tubes from a reservoir located outside the chamber are attached to inlet ports on the lower plexiglass sheet and overflow tubes, each having an overflow bowl, are placed on the upper plexiglass sheet. The mold is then filled with a quantity of de-gassed resin by drawing a vacuum in the chamber. Once the mold is filled, the inlet tubes are clamped off, stopping the flow of resin and causing the vacuum to draw any air bubbles out of the resin. The chamber is then pressurized to force the resin in the overflow bowl back into the mold. This pressure is maintained until the resin hardens, and the gun grip panel is removed from the mold.

8 Claims, 4 Drawing Sheets

GUN GRIP PANEL

FIELD OF THE INVENTION

The present invention pertains to gun grip panels. More specifically, the present invention pertains to high strength gun grip panels of the type used in handguns of various makes and models.

BACKGROUND OF THE INVENTION

Numerous problems exist with the currently available gun grip panels. One such problem is the lack of strength and durability of the gun grip panel. For instance, many handguns are equipped with gun grip panels which are made of wood, rubber, or plastic. While such materials may provide a surface sufficient for the user of the gun to hold on to, the materials are susceptible to cracking and splintering. This shortcoming is, perhaps, most noticeable in the event of a slam-fire. A slam-fire occurs when using a semi-automatic weapon which houses the magazine, or clip, within the handle. More specifically, following the firing of a first round from a semi-automatic handgun, the slide is forced backwards to eject the brass shell casing from that round. After ejecting the shell casing, the slide returns forward while a second round is simultaneously forced forwards from the magazine into the chamber. If the primer of the second round is improperly installed, the primer may come in contact with the bolt face of the slide as the round is being forced forward into the chamber. In the event of such contact, the primer detonates causing the round to likewise be detonated. However, because the round has not yet been fully inserted into the chamber, and because the shell casing is typically made of a soft material such as brass, the shell explodes. This exploding shell forces debris forward out the barrel of the gun, downward out the magazine well, and sideways through the slide ejection port. In fact, the force of such an explosion can be so powerful, that the gun grips covering the sides of the magazine well may be exploded into splintering fragments of wood and plastic. Because the gun operator is usually holding the gun when a slam-fire occurs, substantial injuries can be inflicted.

In an effort to combat the serious injuries caused by low strength gun grip panels, steel has been used in place of plastic, rubber, and wood. While this material is capable of containing the exploding debris caused by a slam-fire, steel gun grip panels are particularly heavy. The increased weight of a metal gun grip panel is often sufficient to cause fatigue resulting in the user having difficulty precisely aiming the gun. This increased weight is perhaps most noticeably a problem for persons requiring precision aiming, such as a competitive or target shooter. As a result of the added weight, metal gun grip panels are not often used. However, due to the number of rounds which they fire, these gun users are the most likely to experience a slam-fire.

SUMMARY OF THE INVENTION

Accordingly, it is an object of the present invention to provide a gun grip panel which will not splinter when subjected to the destructive explosion of a slam-fire.

It is another object of the present invention to provide a gun grip panel which has a high strength-to-weight ratio.

It is yet another object of the present invention to provide a gun grip panel which makes the weapon easy to hold and facilitates the precision aiming of the weapon.

It is another object of the present invention to provide a durable gun grip panel which has an ornamental appearance, yet is durable enough to withstand the rigors of everyday use.

It is yet another object of the present invention to provide a method for manufacturing a gun grip panel which is relatively easy, efficient, and comparatively cost effective.

In an exemplary embodiment of the present invention, a gun grip panel comprises two pieces of a carbon/kevlar woven material separated by a felt spacer. This woven material and felt spacer are encapsulated in a resin to create a highly rigid and durable gun grip panel capable of withstanding not only the rigors of daily use, but the severe explosion of a slam fire. Moreover, if a clear resin is used, the woven material is visible through the resin, giving the gun grip panel an ornamental appearance. Also, the outer surface of the gun grip panel may be textured to improve the grip of the user of the handgun. The gun grip panel may also be made to fit various guns and may be installed post-manufacturing of the gun as a replacement piece.

The inventive method of manufacturing the improved gun grip panel comprises coating a sheet of woven material, for example carbon or kevlar or a carbon/kevlar mixed weave, with a layer of resin to minimize the unraveling of the material then cutting a pair of gun-grip-panel-sized pieces from the woven material. The first piece of woven material is then positioned to substantially cover the bottom of a silicone mold, a felt spacer is positioned atop the first piece of woven material and the second piece of woven material is placed over the felt spacer. The silicone mold, including the first and second piece of woven material and felt spacer, is placed between upper and lower rigid plexiglass sheets (or plates) to sandwich the mold between them, and the combination is placed in a sealable chamber. Inlet tubes from a reservoir located outside the chamber are attached to a number of inlet ports through the lower plexiglass sheet and a number of overflow tubes, each having an overflow bowl, are placed on the upper plexiglass sheet, and the sealable chamber is sealed. The reservoir is then filled with a quantity of de-gassed resin and a vacuum is applied to the chamber to draw the resin through the inlet tubes, through the mold, and out the overflow tubes. Once the mold is filled and the woven material is thoroughly wetted by the resin, the inlet tubes are clamped off, stopping the flow of resin and causing the vacuum to draw any air bubbles out of the resin. The vacuum within the chamber is released and the chamber is then pressurized to force the resin which pooled in the overflow bowl back into the mold, thereby compressing any air bubbles still remaining in the resin. This pressure is maintained until the resin hardens, then the gun grip panel is removed from the mold and drilled, buffed, and prepared for sale.

DESCRIPTION OF THE PREFERRED EMBODIMENT

Figure 1:
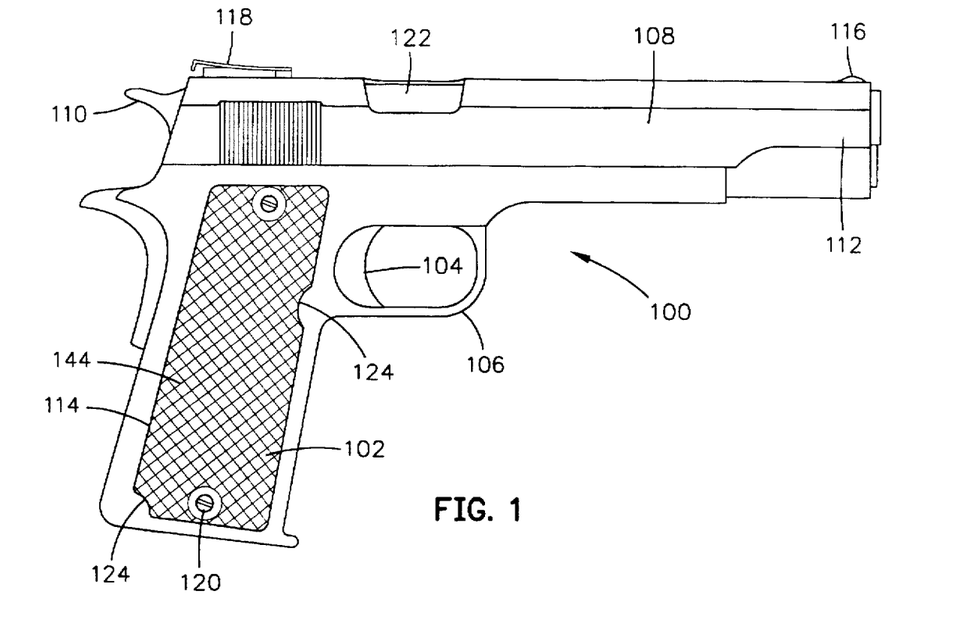
FIG. 1 is a perspective view of a preferred embodiment of the present invention as installed on a semiautomatic handgun.

Referring initially to FIG. 1, atypical semi-automatic handgun is shown and generally designated 100. The gun 100 is shown having an improved gun grip panel 102, a trigger 104, a trigger guard 106, a slide 108, a hammer 110, a barrel 112, a grip 114, a front sight 116 and rear sight 118. While not appreciable from this view, it should be noted that most grips 114 are formed such that there is a hollow area under the portion of the grip covered by the gun grip panel 102. This hollowing is done to minimize the weight of the gun 100 by eliminating portions of metal. The gun grip panel 102 may be secured in place on the grip 114 by any means and is preferably secured with screws 120. These screws 120 thread into a threaded hole (not shown) formed in the frame of the gun 100. Thus, by removing the screws 120, the gun grip panel 102 may be easily replaced.

In normal usage, the gun 100 is held in the hand of the user with the user's index finger on the trigger 104, the thumb behind the grip 114, and the remaining fingers encircling the grip 114 underneath the trigger guard 106. The operation of a semi-automatic gun includes pulling backwards on the trigger 104 to cause the hammer 110 to move forwards to strike the primer of a round (not shown) thereby firing the bullet out the barrel 112 while the slide 108 is simultaneously forced backwards to eject the brass shell casing from the first round out of the ejection port 122, and then forcing a new round into the chamber. If a slam fire occurs during the loading of the new round, it is common for the debris from the explosion to be blown out the ejection port 122, the barrel 112, and downwards out the grip 114. However, due to the high strength of the gun grip panel 102, no debris from the slam-fire explosion will pass through the gun grip panel 102 to injure the user's hand.

Figure 2:
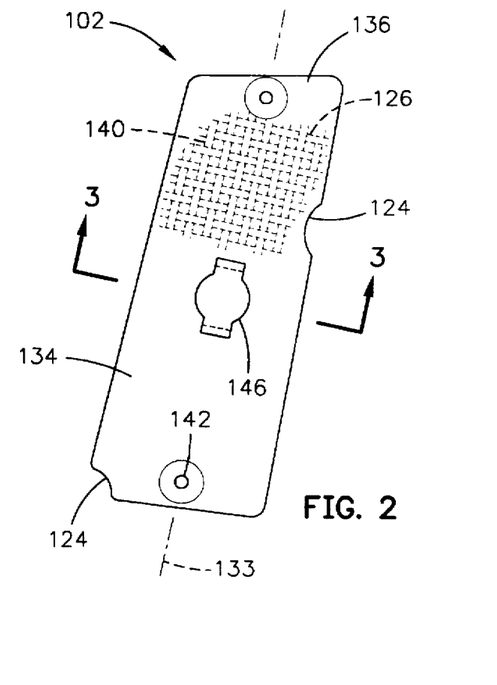
FIG. 2 is a perspective view of a gun grip panel of the present invention.

Referring now to FIG. 2, the preferred gun grip panel 102 is shown in perspective. From this view, the general outline of the gun grip panel 102 shows that there are indentations 124 formed on its perimeter. It should be noted that while the indentations 124 allow the proper fitting of the gun grip panel 102 to the gun 100, these indentations, as well as the overall shape of the gun grip panel 102 vary from gun to gun. More specifically, the gun grip panel 102 shown in FIG. 2 is representative of a gun grip panel shaped for a Colt 45 semi-automatic pistol, and the shape of a gun grip panel for a different model gun would be different.

Figure 3:
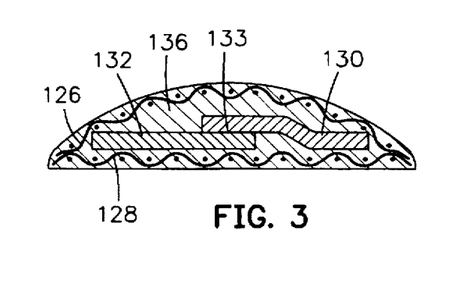
FIG. 3 is a cross-sectional view of a preferred embodiment of the gun grip panel of the present invention as taken along line 3—3 in FIG. 2.

Referring now to FIG. 3, the gun grip panel 102 is shown in cross-section. From this view, the various materials incorporated in the gun grip panel 102 are easily seen. More specifically, the gun grip panel 102 includes an outer woven material 126 and an inner woven material 128. Because these materials 126, 128 are principally responsible for the strength of the gun grip panel, they are chosen to provide maximum strength to the gun panel with a minimum of weight. In particular, the materials are chosen to have a higher strength to weight ratio than is present in either a traditional soft-material gun grip panel, such as wood or plastic or a harder-material gun grip panel, such as steel. Such preferred material include, but are not limited to carbon fiber, kevlar fiber or a carbon/kevlar mixed fiber. Preferably, the fiber material chosen is formed into a weave both for ornamental value and strength. It is to be appreciated, however, that any variety of materials in various forms could be used.

In one preferred embodiment, as shown a pair of felt spacers 130,132 are positioned between the two layers of woven material 126,128 to separate the woven layers 126, 128. As positioned, the felt spacers 130,132 insure that the woven materials 126,128 are maintained against the outer resin surface 134 of the gun grip panel 102. While this is not critical to the proper functioning of the gun grip panel 102, it is preferred in order to provide the most ornamental effect. In fact, the strength of the gun grip panel 102 would be comparable if only one layer of woven material was used.

Figure 4:
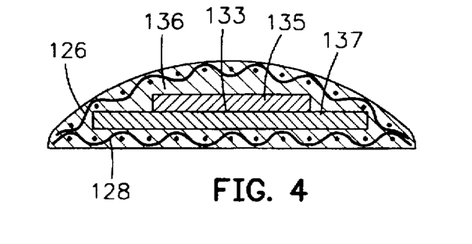
FIG. 4 is a cross-sectional view of an alternative embodiment of the gun grip panel of the present invention showing alternative spacer pads.

FIG. 4 shows an alternative embodiment of the present invention having a narrow spacer 135 which is placed against the woven layer 126, and a wide spacer 137 which is placed adjacent the narrow spacer 135 to hold the woven layer 128 away from the woven layer 126, and against the outer surface of the gun grip panel. While the particular spacers discussed herein have been found to provide sufficient spacing between the two layers of woven material 126, 128, it is to be appreciated that virtually any shape spacer, or combination of spacers could be used as long as the two sheets of woven material are sufficiently separated. In fact, a spacer having a flat side and a curved side would, perhaps, eliminate the need for a pair of spacers 130,132, or 135,137, and represents an additional embodiment of the present invention.

As described previously and in detail, below, the two layers of woven material 126,128 with the felt spacers 130,132 between them are encapsulated in a resin 136. This resin 136 is preferably substantially clear. Such clarity allows for the natural colors of the woven materials 126,128 to be visible and thus is preferred for the visual effect it provides, not the strength, which is not dependent on color. In a particularly preferred embodiment, the fiber weave material is a carbon fiber weave alone, which is generally a dark grey color, or is a kevlar fiber which is generally a yellow color, or is a combination of the carbon fiber woven with the kevlar fiber. When the gun grip panel 102 is made with the carbon/kevlar woven material, the gun grip panel will appear to have a yellow and dark grey checker-board pattern 140. Referring back to FIG. 2, the checker-board pattern 140 is shown by dotted lines indicating the crossing of the woven strands of the materials. From this view it is also to be appreciated that a variety of visual effects could be created by using woven materials having different sized weaves, using differently colored materials and/or resins and/or orienting the weave pattern in different directions within the gun grip panel. Thus, it will also be appreciated that although a preferred embodiment uses resin 136 which is substantially clear, a variety of colored resins could be used to achieve a virtually unlimited number of color combinations. Such color and texture combinations are particularly useful when attempting to create gun grip panels 102 which are substantially similar in appearance to the gun's original gun grip panel or where customized gun panels are desirable.

Figure 5:
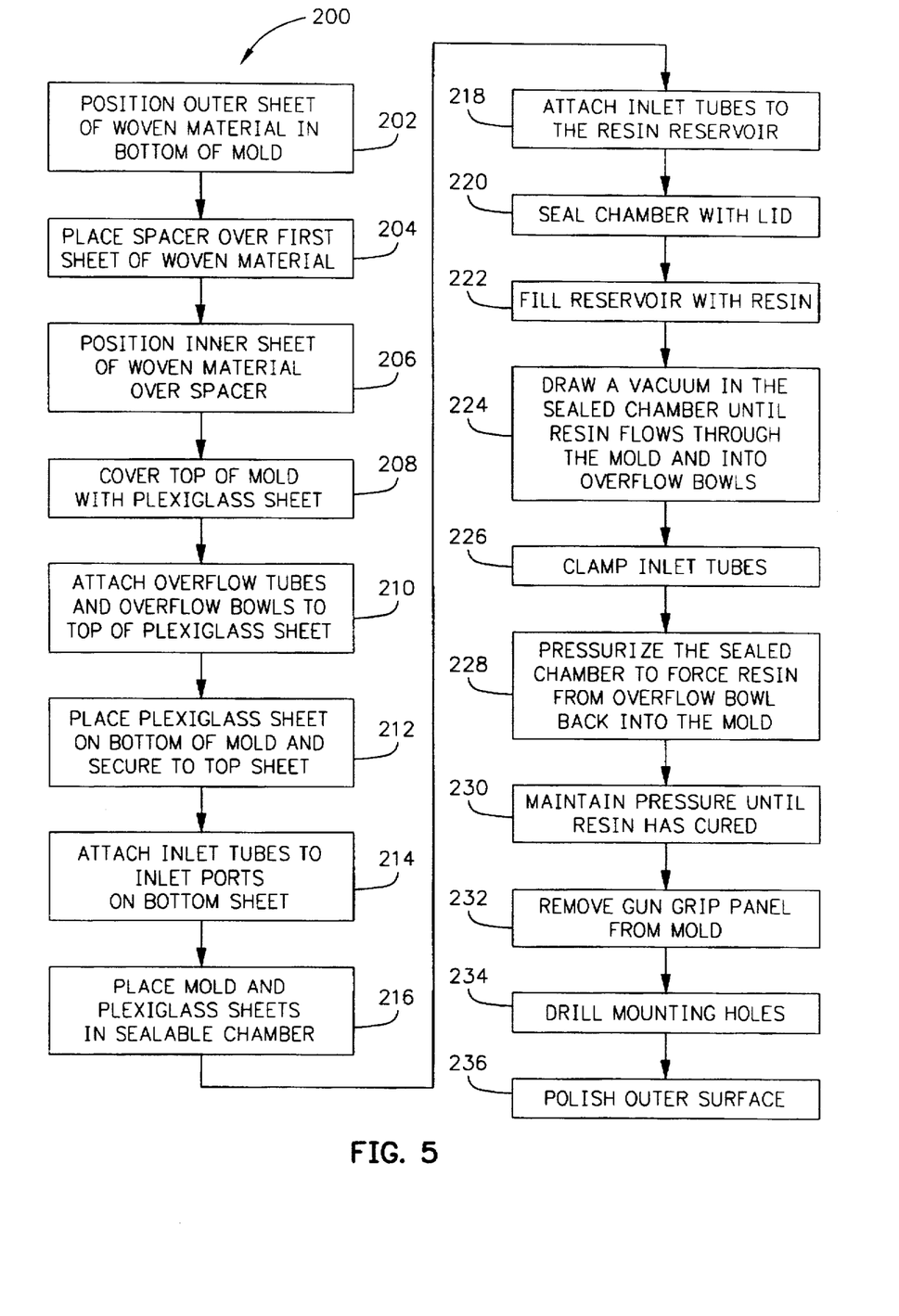
FIG. 5 is a flow chart showing the method of manufacturing the gun grip of the present invention.
Figure 6:
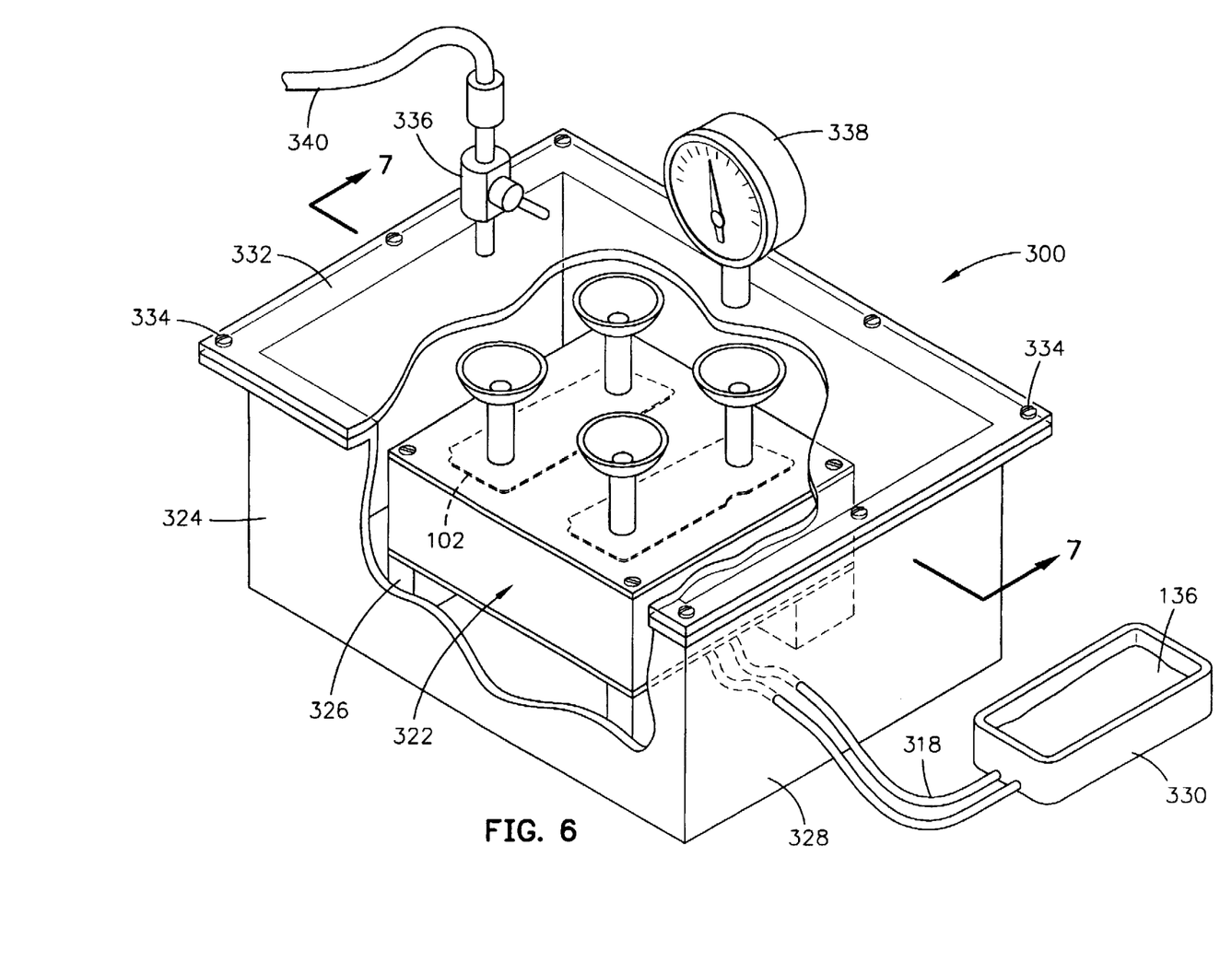
FIG. 6 is a perspective view of the apparatus used to manufacture the gun grip panel of the present invention, with portions cut away for clarity.
Figure 7:
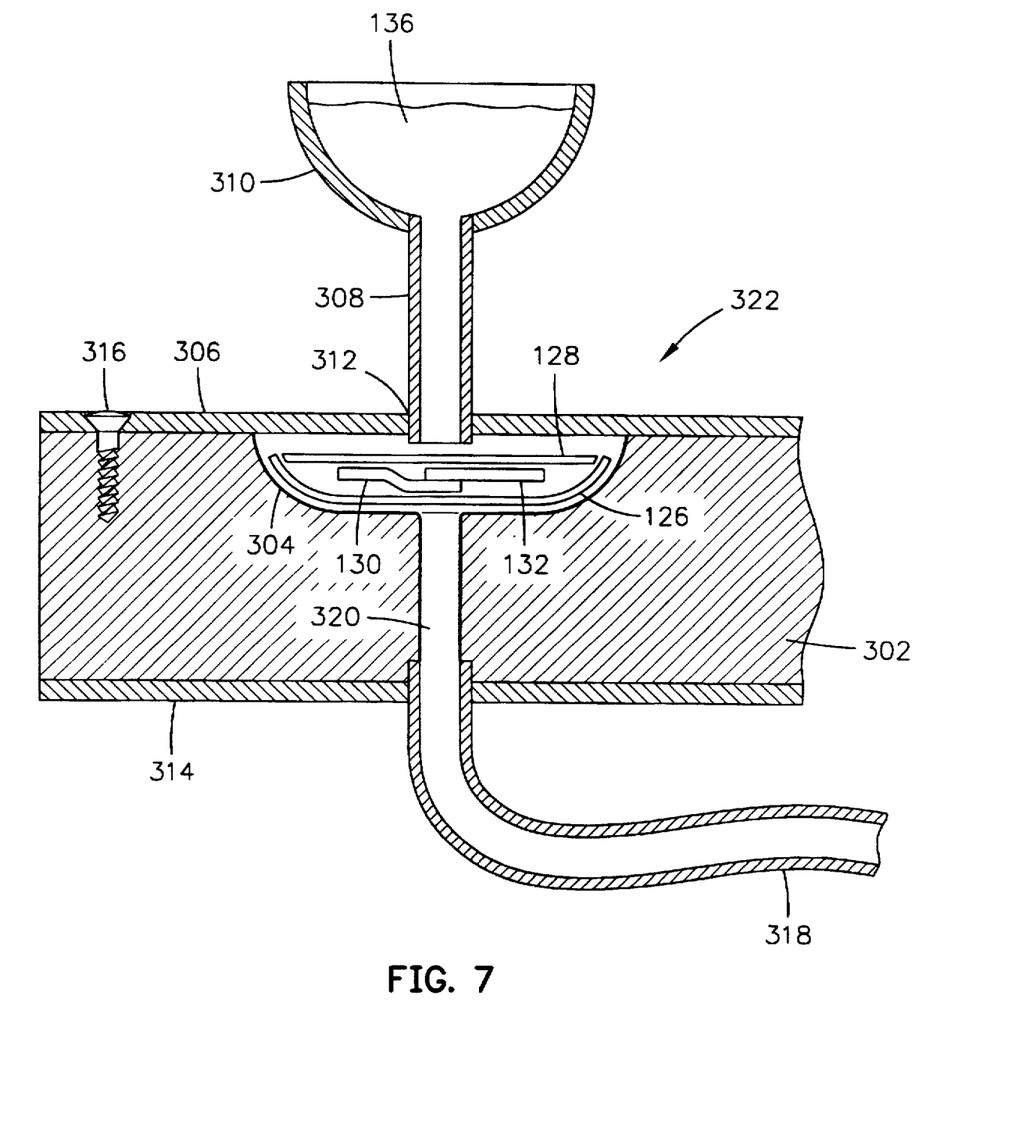
FIG. 7 is a cross-sectional view taken along line 6—6 of a portion of the apparatus of FIG. 5 showing the inlet tube, mold, and overflow tube with an overflow bowl.

Referring now to FIG. 5, a flow chart for the method for manufacturing the improved gun grip panel is shown and generally designated 200. In order to understand the method for manufacturing the gun grip panels 102, the apparatus used in such process is shown in FIG. 6, and generally designated 300. Further, the details of the mold 302 used in the process are shown in FIG. 7. While the method for manufacturing the gun grip panels 102 will be discussed in conjunction with the apparatus 300, it will be appreciated that the actual mechanical structures used to implement the process are not critical, and any variety of mechanical structures may be used.

Referring to FIG. 5, the first step 202 includes positioning the outer sheet of woven material 126 against the bottom surface 304 of the mold 302. This woven material 126, as discussed above, is preferably a carbon, kevlar, or carbon/ kevlar mix weave. Generally such materials are available in sheet form. Due to the fibrous nature of the material, however, it is often difficult to cut out a piece of the material which matches the outline of the gun grip panel, without the material beginning to unravel. In fact, the material may unravel sufficiently that it simply falls apart prior to placement within the mold. Therefore, it is advantageous to coat the material with a thin layer of resin prior to cutting it. Once coated, the material may be cut and trimmed without unravelling.

The mold 302, illustrated in FIG. 6 and more specifically shown in FIG. 7, is preferably made from a blue silicone material which is both sufficiently rigid to provide a good molding surface, yet resilient enough to allow easy removal of the gun grip panel when finished. This mold 302 may be manufactured by various known means. A preferred means of manufacture comprises placing an original gun grip panel on the bottom of a fluid container with the grip portion facing upward, then pouring a quantity of silicone over the original gun grip panel and allowing it to harden. Once hardened, the silicone mold is removed from the fluid container and is ready to be used to make the improved gun grip panels 102 of the present invention. It should be noted that, instead of silicone, a variety of other materials may e used so long as the resulting mold is somewhat flexible and yields an improved gun grip panel having sufficient surface definition. For example, the mold 302 could be made from rubber or plastic.

Following placement of the outer sheet of woven material 126 on the surface 304, a pair of felt spacers 130,132, if employed, are placed on the top of the outer sheet 126, as described in step 204. The felt spacers 130,132 are approximately as long as the gun grip panel 102, but are approximately 70% as wide. Because the felt spacers 130,132 are more than half as wide as the gun grip panel 102, they overlap one another at the approximate center of the mold 302 when placed therein. In other words, the two felt spaces 130, 132 overlap along the longitudinal axis of the improved gun grip panel 102. Although felt is used in this embodiment, it is noted that any material may be used for the spacer. In fact, any material which will maintain it's thickness during the manufacturing process could be used. Such spacer materials could include, for example, cardboard, wood, and plastic. Additionally, as will be appreciated by those of skill in the art, a single spacer or more than two spacers may be used. It is again noted that while the preferred embodiment illustrated uses a spacer 130,132, no spacer is necessary to achieve the improved strength of this gun grip panel 102, rather such spacer is included to provide the desired shape to the gun grip panel and to enhance the appearance of the panel. The strength of the gun grip panel 102 is due, primarily, to the combination of the woven materials 126,128 and resin 136.

In step 206, the inner sheet of woven material 128 is placed on the top of the felt spacer 132. Referring again to FIGS. 3 and 6, the benefit of the spacers 130,132 is clearly seen. More specifically, the felt spacer, as inserted between the outer sheet of woven material 126 and the inner sheet of woven material 128, serves to maintain a distance between the woven materials. Thus, due to the spacer, the two sheets of woven material 126,128 are held toward the outer surface of the gun grip panel 102. By maintaining the placement of the woven materials 126,128 near the outer surface 134 of the gun grip panel 102, the patterns of the woven material are more easily seen. Also, as appreciated from FIG. 3, if there were no spacer, there would be nothing in the gun grip panel 102 to prevent the outer sheet of woven material 126 from collapsing onto the inner sheet of woven material 128 during the manufacturing process. However, as stated above, only one sheet of woven material 126 may be used. Where a single sheet of woven material is used (or two or more sheets without a spacer therebetween), resin will fill the mold and form the entire upper portion of the gun grip panel. The appearance of such a gun grip panel may not be as ornamental because the material would not necessarily be adjacent the outer surface 134 of the gun grip panel 102. Moreover, because the woven material would not be near the entire outer edge of the gun grip panel, the gun grip panel 102 would appear substantially clear when viewed from one end. Thus, the two sheets of woven material, separated by the spacer, provides a better gun grip panel 102 having a high quality appearance.

In step 208, once the sheets of material 126,128 and spacer 130,132 are positioned in the mold 302, the mold is covered by the top plexiglass, or other appropriate material, sheet 306. The top plexiglass sheet 306 is rigid enough so that it will not bend or flex during the manufacturing process. As an alternative to plexiglass, steel or any other rigid material may be used. However, as discussed further below, plexiglass is a preferred material for this process, among other things, because it permits visualization of the manufacturing process thereby insuring the process is properly performed.

In step 210, and as shown in FIG. 7, overflow tubes 308 with overflow bowls 310 are placed on the top plexiglass sheet 306. These overflow tubes 308 are inserted through a number of overflow ports 312 formed in the top plexiglass sheet 306. In order to minimize the cost of the manufacturing process, the overflow tubes 308 are preferably cut from plastic tubing such as is used to form typical drinking straws. Also, the overflow bowls 310 are preferably formed from silicone. By using such inexpensive and therefore disposable material for the overflow tube 308, and such a readily available, inexpensive and disposable bowl for the overflow bowl 310, the manufacturing each gun grip panel is simplified. More specifically, during the manufacturing process, the various manufacturing components are often coated with resin which would be difficult and time consuming to clean. By using components which are disposable, no time is wasted by attempting to clean those components.

Once the top plexiglass sheet 306 is fitted with the overflow tubes 308 and overflow bowls 310, a bottom plexiglass sheet 314 is placed under the mold 302 and attached to the top plexiglass sheet 306 as described in step 212 and shown in FIG. 7. The present embodiment uses screws 316 to hold the two sheets 306,314 together, but it will be appreciated that such attachment may be by any other means known in the art, such as bolts, bands, or clamps.

In step 214, once the bottom plexiglass sheet 314 is attached to the mold 302, inlet tubes 318 are attached to the inlet ports 320 formed in the mold 302. The inlet ports 320 provide a fluid channel between the inlet tube 318 and the mold 302 so that resin 136 may be drawn through the inlet tube 318, through the inlet port 320, and into the mold 302. As discussed above in conjunction with the overflow tube 308 and overflow bowl 310, the inlet tube 318 is also made from an inexpensive material. In particular, the inlet tubes 318 are made from commonly available plastic tubing, for example as is generally used for drip irrigation systems. As above, the use of the inexpensive plastic tubing allows the inlet tubes 318 to be discarded after a single use, thereby minimizing the time and effort required for the manufacturing process, as well as minimizing the cost of the process.

Once the inlet tubes 318 are attached to the inlet ports 320, the entire assembly 322 of the mold 302, plexiglass sheets 306,314, overflow tubes 308, overflow bowls 310, and inlet tubes 318 are placed in a sealable chamber 324 in step 216. Referring now to FIG. 6, the mold 302 is shown placed on blocks 326, or otherwise raised, in the center of the sealable chamber 324. The blocks 326 are only necessary because the inlet ports 320 are formed in the bottom of the mold 302. It is to be appreciated that were the inlet ports 320 formed in the sides of the mold 302, the inlet tubes 318 would not need to pass under the mold 302, thereby dispensing with the need for the blocks 326.

Also shown in FIG. 6, the overflow tubes 308 and overflow bowls 310 are extending from the top plexiglass sheet 306. The placement of the overflow tubes 308 is not particularly important to the manufacture of the gun grip panel 102. However, the placement of the inlet ports 320 is important. Specifically, because the gun grip panel 102 is formed in the mold with its grip surface 134 facing downward, any imperfection in that surface would be visible in the final product. As a result, it is preferred to locate the inlet ports 320 at the precise point where the mounting holes 142 are. Thus, even if there are imperfections in the gun grip panel 102 caused by the inlet ports 320, those imperfections are removed during the drilling process discussed below. On the other hand, any imperfections in the gun grip panel 102 caused by the overflow tube 308 will be on the back of the gun grip panel 102 which is juxtaposed against the gun 100, and thus out of view.

Following the placement of the mold assembly 322 into the sealable chamber 324, the inlet tubes 318 are routed through the wall 328 of the chamber 324 to the resin reservoir 330, as indicated in step 218. This reservoir 330 is located outside the chamber 324 and is sized to hold the quantity of resin 136 necessary to fill the mold 302. However, because the reservoir 330 is located out of the chamber 324, refilling the reservoir during the manufacturing process is possible. As with many other components which are exposed to the resin, the reservoir 330 may be made from a disposable material. For instance, when manufacturing a single pair of gun grip panels 102, the reservoir 330 may be made from standard polyvinylchloride (PVC), such as is used as a standard end cap for sprinkler pipe. The PVC cap is simply drilled to accept the inlet tubes. Thus, once finished with the manufacturing of the gun grip panels 102, the reservoir 330 may be discarded, again minimizing the time and expense of the process. It will be appreciated, however, that reservoirs 330 may have a variety of sizes, corresponding to molds 302 capable of simultaneously making a number of gun grip panels 102 or corresponding to molds for manufacturing various sizes of gun grip panels.

After positioning the mold assembly 322 in the chamber 324 and attaching the inlet tubes 318 to the reservoir 330, the chamber 324 is sealed by installing the chamber lid 332, as described in step 220. The chamber lid 332 of the preferred embodiment is made of plexiglass. As will be discussed below, the chamber 324 will experience a variety of vacuums and pressures. As a result, the strength of the chamber 324 and lid 332 is critical. In order for a plexiglass lid 332 to withstand these pressures, it must be fairly thick. The required thickness of the chamber material will depend upon the particular material chosen, the width and length of the material and the ultimate pressures and vacuums to be used. Such determinations are readily made by those of skill in this art. For example, where pressures of about five (5) atmospheres are used, as described herein, a sheet of plexiglass that is about 12" wide and 21" long will be about 1" thick. The lid 332 is attached to the chamber 324 using bolts 334. As shown in FIG. 6, the lid 332 is equipped with an air valve 336 and a vacuum/pressure gauge 338. The air valve 336 allows the various pressures and vacuums to be created in the chamber 324, and the vacuum/pressure gauge 338 provides the manufacturer with an indication of the condition within the sealed chamber 324.

In step 222, the reservoir 330 is filled with resin 136. The resin 136 used in the preferred embodiment is a combination of West System 105 Epoxy Resin and West System 206 Hardener available from Gougeon Brothers, Inc. of Bay City, Mich. These particular products have been selected for the gun grip panels 102 for several reasons. Namely, the West System products provide superior clarity after hardening than do other resins. While the clarity is not essential for the proper strength of the gun grip panel, using resin with a high degree of clarity produces a gun grip panel which looks better. Specifically, the more clear the resin, the more clearly the woven material 126,128 is seen within the gun grip panel 102. As a result, the various colors of the carbon/kevlar woven material are visible through the gun grip panel. In addition to the clarity, the West products have a relatively short cure cycle allowing for a faster manufacturing process than many of the other resins.

To help minimize the air bubbles which are introduced into the mold 302, the resin 136 may be de-gassed prior to being poured into the reservoir 330. Such de-gassing is accomplished by placing the resin 136 in a vacuum for a short period, thereby drawing out any air bubbles that may be present. The vacuum needed to sufficiently de-gas 12 ounces of epoxy is approximately 20–25 inches of mercury, maintained for about 5 minutes. Those of skill in the art may readily determine the appropriate degree and duration of vacuum required to de-gas a particular amount and type of epoxy. For example, a lesser vacuum will nonetheless decrease the amount of air suspended within the resin 136.

In an alternative embodiment of the present invention, a polyurethane compound may be used as the resin 136. POLY-OPTIC 1410 Clear Casting Polyurethane, parts A and B, available from Polytek, 55 Hilton Street, Eaton, Pa. 18042, has also been used to make the improved gun grip panel 102 of the present invention. The POLY-OPTIC polyurethane, however, is more difficult to use than the West System products described above. Specifically, the polyurethane does not bond to the woven materials as well as the resin. This problem results in a failure rate of manufacturing which is significantly higher than the failure rate of the resin gun grip panels. However, the polyurethane gun grip panels have an extremely high resistance to scratching. In fact, because the polyurethane is more flexible than the presently preferred epoxy resin, the polyurethane gun grip panel may be repeatedly struck with a hammer, while not sustaining the slightest damage. In addition to the resins discussed herein, it is to be appreciated that any variety of compounds known in the art may be used in the manufacture of the gun grip panels 102.

Once the reservoir 330 has been filled with resin 136, a vacuum is attached to the hose 340 which is attached to the air valve 336 on the chamber lid 332, as described in step 224. A vacuum of approximately 5 inches of mercury is created in the chamber 324 to draw the resin 136 from the reservoir 330, through the inlet tube 318 and inlet port 320, filling the mold 302, and up through the overflow tube 308 and into overflow bowl 310. The particular vacuum or pressure within the chamber 324 is monitored by reference to the vacuum/pressure gauge 338. The exact level of vacuum is not critical, so long as the vacuum is sufficient to draw the resin 136 through the system. In fact, as is understood by those of skill in the art, various resins have different viscosities; thus, the vacuum will be varied to match the particular resin material used. During this process of filling the mold with resin 138, it is helpful to view the resin as it fills the mold 302 to ensure that the woven material 126, 128 are properly wetted by the resin 138 and that the resin completely fills the mold 302. This is possible when both the chamber lid 332, and the top plexiglass sheet 306 are clear, as is the case in the preferred embodiment illustrated.

Thus, as the resin 136 is slowly drawn up through the mold 102 to immerse the outer sheet of material 126 and the inner sheet of material 128 with the spacers 130,132 between them, it is possible to modulate the vacuum to insure that the resin 136 flows evenly throughout the mold 102. This modulation helps to insure that there will be no air bubbles of any significant size remaining in the mold once the resin 136 is drawn in. Once the mold is full of resin 136, the vacuum is maintained until the resin 136 flows up through the overflow tube 308 and pools in the overflow bowl 310. Once the resin 136 has flowed into the overflow bowl 310, the inlet tubes 318 are clamped off to prevent the continued flow of the resin 136, as described in step 226. Clamping the inlet tubes 318 also prevents the back-flow of the resin 136 into the reservoir 330 when the vacuum is removed.

After the mold 302 and overflow bowls 310 have been filled with resin 136, the vacuum is removed from hose 340 and a pressurized air source is connected to hose 340 instead. As an alternative to the thick plexiglass lid 332 discussed above, the lid 332 may be made of steel. While a steel lid 332 has a higher strength per unit thickness, a steel lid is not transparent. As a result, in order to visualize the flow of the resin 136 during the filling of the mold 302 of step 224, a plexiglass lid is required. On the other hand, after the mold 302 is full, a steel lid 332 may be substituted. In fact, because the vacuum created to draw the resin 136 into the mold 302 creates a smaller stress on the lid 332, a thinner plexiglass lid 332 may be used if a steel lid is substituted for the pressurization step 228.

In step 228, the sealed chamber 324 is pressurized to a pressure of approximately five (5) atmospheres which causes the minimization of any remaining air bubbles in the mold. To accommodate this minimization, the resin in the overflow bowl is available to fill any void which would otherwise be created in the gun grip panel 102. In fact, as a result of the back-flow of the resin 136 into the mold 302, it is critical that there be a sufficient quantity of resin 136 in the overflow bowl 310 available.

Once the chamber 324 has been pressurized to the desired pressure, the pressure is maintained until the resin 136 has cured, as indicated in step 230. The cure times of the various resins differ but are readily determinable, either by reference to the resin manufacturer's instructions or other means as is generally known in the art. As a result, it is important to be certain that the cure time selected is long enough to allow the resin to fully cure. Such a cure time for the West System's materials is approximately 3–5 hours. As is well known to those of skill in the art, it is important that the cure time be respected, otherwise, the gun grip panel 102 will be pliable when removed from the mold 302.

Once the resin 136 has cured, the gun grip panel 102 is removed from the mold 302 in step 232. In order to remove the gun grip panel 102, the pressure is slowly released from the chamber 324 through air valve 336, and the lid 332 is removed. Once the lid 332 is removed, the mold assembly 322 is removed from the chamber 324 and the overflow tubes 308, overflow bowls 310, and inlet tubes 318 are discarded. Then, the top plexiglass sheet 306 and the bottom plexiglass sheet 314 are removed to leave only the silicone mold 302 with the newly formed gun grip panels 102 therein. Because the silicone mold 302 is flexible, the gun grip panels 102 may be released from the mold 302 simply be bending the mold to pop the gun grip panels out. Similarly, if there is any residual resin 136 on any surface of the mold 302, it may also be removed simply be bending the mold 302 at the affected area. As a result, immediately following the removal of a newly formed gun grip panel 102, the mold 302 is ready to be used again, without any extensive or time consuming cleaning process.

Following removal from the mold 302, the mounting holes 142 are drilled in the gun grip panel 102, as set forth in step 234. As discussed above in conjunction with the placement of the inlet ports 320, by drilling the mounting holes 142, any imperfection that was created in the gun grip panel 102 due to the inlet port 320 is removed. Once the gun grip panel 102 is drilled, the outer surface 134 of the gun grip panel 102 is polished to create a glossy surface, ready for use.

Referring back to FIG. 1, the gun grip panel 102 is illustrated with a cross-hatch pattern 144 on the outer resin surface 134, commonly called "checkering." Such a pattern is designed to increase the friction between the gun grip panel 102 and the user's hand, thereby increasing the level of control of the gun. It is to be appreciated that while the figures discussed above do not specifically show the cross-hatch pattern, a gun grip panel 102 with such a pattern may be manufactured by the above discussed method. A gun grip panel 102 having such a "checkering" grip pattern is made simply by creating a mold 302 having the pattern already formed in it, and following the above detailed manufacturing process.

In addition to checkering, a pad for mounting a miniature placard or emblem 146 may be formed in the gun grip panel 102 as shown in FIG. 2. Like the checkering discussed above, the pad may be formed in the gun grip panel simply by making a mold 302 having the pad. It will be appreciated that the pad may be of a variety of sizes and shapes in order to accommodate placards having a variety of dimensions. Such placards would be of particular interest to those handgun users wishing to display their affiliation to a certain organization, such as a police department or National grip panel 102, or the placard may simply be epoxied or otherwise affixed, as by gluing, onto the pad following the manufacturing process.

Those of skill in the art will readily appreciate that there are additional embodiments which are not illustrated herein but which are clearly within the scope and spirit of the present invention. The above description and drawings are therefore intended to be exemplary only and the scope of the invention is to be limited solely by the appended claims.

We claim:

1. An improved gun grip panel having a longitudinal axis, a first edge and a second edge substantially parallel to said longitudinal axis, said gun grip panel comprising:

a sheet of woven material, said sheet of woven material being substantially gun-grip-panel-shaped;

a second sheet of woven material, said second sheet of woven material being substantially gun-grip-panel-shaped and adjacent said sheet of woven material;

a first spacer pad;

a second spacer pad, said first spacer pad and said second spacer pad being positioned within said gun grip panel such that they overlap approximately at said longitudinal axis of said gun grip panel to separate said sheet of woven material and said second sheet of woven material further at said longitudinal axis than at said edges; and said sheet of woven material, said second sheet of woven material, said first spacer pad and said second spacer pad being encapsulated with a resin to form the gun grip panel, and wherein said sheet of woven material, said second sheet of woven material, said first spacer pad, said second spacer pad and said resin cooperate to provide a gun grip panel having increased strength.

2. An improved gun grip panel as recited in claim 1, wherein said first spacer pad and said second spacer pad is made of felt.

3. An improved gun grip panel having a grip surface, comprising:

a sheet of woven material, said sheet of woven material being substantially gun grip panel shaped;

a felt spacer, said felt spacer positioned against said sheet of woven material to hold said sheet of woven material adjacent said grip surface; and a resin surrounding said sheet of woven material and hardened in the shape of said gun grip panel.

4. An improved gun grip panel, comprising:

at least one sheet of material encapsulated within a resin;

at least one felt spacer pad encompassed by the material, wherein the felt spacer pad serves to urge the material toward the outer edges of the gun grip panel; and wherein during a slam fire, the gun grip panel remains whole.

5. The improved gun grip panel of claim 4, wherein the material is selected from the group consisting of carbon fiber, kevlar, and carbon fiber interwoven with kevlar.

6. The improved gun grip panel of claim 5, wherein the material is coated with said resin prior to encapsulation.

7. The improved gun grip panel of claim 4, wherein the resin is selected from the group consisting of epoxy resins and polyurethane resins.

8. The improved gun grip panel of claim 4, wherein the spacer pad comprises two felt spacers.

* * * * *